United States Patent
Bansal et al.

(10) Patent No.: US 9,064,071 B2
(45) Date of Patent: *Jun. 23, 2015

(54) USAGE-BASED TEMPORAL DEGRADATION ESTIMATION FOR MEMORY ELEMENTS

(75) Inventors: Aditya Bansal, White Plains, NY (US); Jae-Joon Kim, Old Tappan, NJ (US); Rahul M. Rao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/306,365

(22) Filed: Nov. 29, 2011

(65) Prior Publication Data

US 2013/0138403 A1     May 30, 2013

(51) Int. Cl.
    *G06F 17/10*     (2006.01)
    *G06F 17/50*     (2006.01)

(52) U.S. Cl.
    CPC ........ *G06F 17/5036* (2013.01); *G06F 2217/76* (2013.01)

(58) Field of Classification Search
    CPC ............ G06F 17/5036; G06F 17/5068; G06F 17/5022; G06F 17/5081; G06F 2217/70; G06F 2217/76; G06F 2217/78; G03F 1/144
    USPC ............ 703/2, 9, 14, 15, 21; 716/51, 52, 106, 716/11, 112, 136
    See application file for complete search history.

(56) References Cited

U.S. PATENT DOCUMENTS

| | | | |
|---|---|---|---|
| 7,380,225 B2 | 5/2008 | Joshi et al. | |
| 7,886,243 B1 | 2/2011 | Gumaste et al. | |
| 7,890,900 B2 | 2/2011 | Aleksanyan et al. | |
| 7,921,402 B2 | 4/2011 | He | |
| 7,937,179 B2 | 5/2011 | Shimshi et al. | |
| 2008/0005736 A1* | 1/2008 | Apacible et al. | 718/100 |
| 2010/0027335 A1* | 2/2010 | Kim et al. | 365/185.09 |
| 2011/0299335 A1* | 12/2011 | Lee et al. | 365/185.03 |

OTHER PUBLICATIONS

Kumar et al. (Impact of NBTI on SRAM read stability and design for reliability, Jan. 2006 (6 pages).*
Qi et al. (SRAM-Based NBTI/PBTI Sensor System Design, 2010, 4 pages).*

* cited by examiner

*Primary Examiner* — Kamini S Shah
*Assistant Examiner* — Andre Pierre Louis
(74) *Attorney, Agent, or Firm* — Tutunjian & Bitetto, P.C.; Preston J. Young

(57) ABSTRACT

Methods and systems for computing threshold voltage degradation of transistors in an array of memory cells are disclosed. In accordance with one method, a process that models an expected usage of the array is selected. In addition, a hardware processor can run the process to populate the array with data over time to simulate the expected usage of the array. The method further includes compiling data that detail different durations at which each of the memory cells in the array stores 1 or at which each of the memory cells in the array stores 0. For each separate grouping of memory cells that share a common duration of the different compiled durations, a threshold voltage degradation is determined for each transistor in the corresponding grouping of cells based on at least one biased temperature instability model.

12 Claims, 6 Drawing Sheets

USAGE-BASED TEMPORAL DEGRADATION ESTIMATION FOR MEMORY ELEMENTS

BACKGROUND

1. Technical Field

The present invention relates to memory systems, and, more particularly, to methods, systems and devices for estimating temporal degradation in memory systems.

2. Description of the Related Art

Memory elements of circuits, such as VLSI (Very Large Scale Integration) circuits, are designed using imperfect processes. As such, numerous tests are typically run to assess the functionality of the memory elements and to determine their yield based on the assessments. In particular, temporal degradation of the memory elements is estimated to determine the yield. However, models that over-estimate the temporal degradation can lead to the discarding of dies that actually meet system specifications. In turn, models that under-estimate the temporal degradation can lead to the release of packaged integrated circuits that may degrade at a customer's location. As such, accurate estimations of temporal degradations should be used to maximize yield.

SUMMARY

One embodiment is directed to a method for computing threshold voltage degradation of transistors in an array of memory cells. In accordance with the method, a process that models an expected usage of the array is selected. In addition, a hardware processor can run the process to populate the array with data over time to simulate the expected usage of the array. The method further includes compiling data that detail different durations at which each of the memory cells in the array stores 1 or at which each of the memory cells in the array stores 0. For each separate grouping of memory cells that share a common duration of the different compiled durations, a threshold voltage degradation is determined for each transistor in the corresponding grouping of cells based on at least one biased temperature instability model.

An alternative embodiment is directed to a computer readable storage medium that includes a computer readable program for computing threshold voltage degradation of transistors in an array of memory cells. The computer readable program when executed on a computer causes the computer to perform a plurality of steps. Here, a process that models an expected usage of the array is selected. In addition, the process is run to populate the array with data over time to simulate the expected usage of the array. The steps further include compiling data that detail different durations at which each of the memory cells in the array stores 1 or at which each of the memory cells in the array stores 0. Further, for each separate grouping of memory cells that share a common duration of the different compiled durations, a threshold voltage degradation is determined for each transistor in the corresponding grouping of cells based on at least one biased temperature instability model.

Another embodiment is directed to a system for computing threshold voltage degradation of transistors in an array of memory cells. The system includes a controller, a monitor and a computation module. The controller is implemented by a hardware processor and is configured to select a process that models an expected usage of the array. The controller is further configured to run the selected process to populate the array with data over time to simulate the expected usage of the array. The monitor is configured to compile data that detail different durations at which each of the memory cells in the array stores 1 or at which each of the memory cells in the array stores 0. In addition, the computation module is configured to determine, for each separate grouping of memory cells that share a common duration of the different compiled durations, a threshold voltage degradation for each transistor in the corresponding grouping of cells based on at least one biased temperature instability model and based on a degree of recovery after relaxation that is determined from the common duration.

An alternative embodiment is directed to a method for computing at least one of circuit fail probability or circuit yield of a circuit including a plurality of arrays of memory cells. In accordance with the method, at least one process that models an expected usage of the arrays is run by a hardware processor to populate the arrays with data over time to simulate the expected usage of the arrays. The method further includes compiling data that detail different durations at which each of the memory cells in each of the arrays stores 1 or at which each of the memory cells in each of the arrays stores 0. For each of the arrays and for each separate grouping of memory cells in the corresponding array that share a common duration of the different durations compiled for the corresponding array, a cell fail probability is determined based on at least one biased temperature instability model. Further, at least one of the circuit fail probability or circuit yield of the circuit is computed based on the determined cell fail probabilities.

Another embodiment is directed to a system for computing at least one of circuit fail probability or circuit yield of a circuit including a plurality of arrays of memory cells. The system includes a controller, a monitor, a threshold voltage shift computation (TVSC) module and a statistical computation module. The controller is implemented by a hardware processor and is configured to run at least one process that models an expected usage of the arrays to populate the arrays with data over time to simulate the expected usage of the arrays. In addition, the monitor is configured to compile data that detail different durations at which each of the memory cells in each of the arrays stores 1 or at which each of the memory cells in each of the arrays stores 0. Further, the TVSC module is configured to determine, for each of the arrays and for each separate grouping of memory cells in the corresponding array that share a common duration of the different durations compiled for the corresponding array, a threshold voltage degradation for each transistor in the corresponding grouping of cells based on at least one biased temperature instability model. Additionally, the statistical computation module configured to determine, for each of the arrays and for each separate grouping of memory cells in the corresponding array that share a common duration of the different durations compiled for the corresponding array, a cell fail probability based on the threshold voltage degradation determined for the transistors in the corresponding grouping of cells of the respective array. The statistical computation module is further configured to compute at least one of the circuit fail probability or circuit yield of the circuit based on the determined cell fail probabilities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
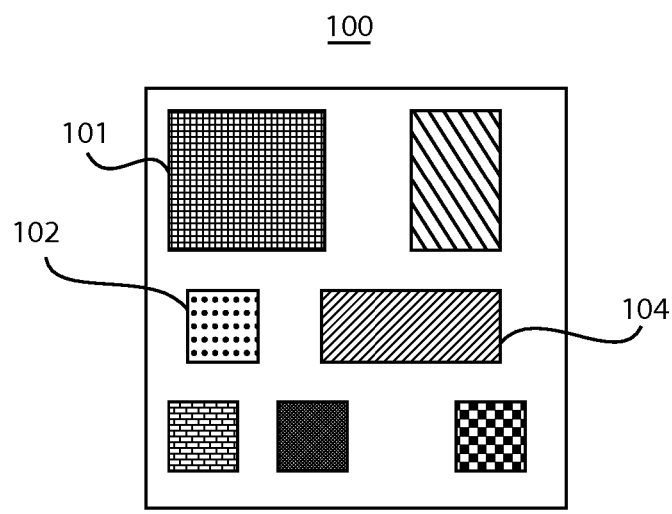
FIG. 1 is a high-level block diagram of an exemplary circuit that includes arrays of memory cells in accordance with one illustrative embodiment.

Important factors that lead to the degradation of memory elements include Negative Bias Temperature Instabilities (NBTI) and Positive Bias Temperature Instabilities (PBTI). The magnitude of threshold voltage of P-type metal-oxide-semiconductor (PMOS) and N-type metal-oxide-semiconductor (NMOS) transistors that are subjected to NBTI and/or PBTI increases with use over time. Further, an increase in threshold voltage results in reduced current, thereby causing performance degradation. This increase in threshold voltage strongly depends on how long a transistor remains in ON state or OFF state. For example, NBTI/PBTI stress a transistor that is in an ON state and cause an increase in threshold voltage shift. In contrast, transistors subject to NBTI/PBTI tend to recover while in the OFF state, resulting in a decrease in the threshold voltage. This phenomenon can result in transistor strength mismatch with usage. Static Random Access Memories (SRAMs) are highly sensitive to transistor strength mismatch. Hence, NBTI and PBTI can reduce SRAM cell stability over time and can lead to memory failure during usage of the SRAMs.

A simple approach to estimating the temporal degradation of SRAMs assumes that each cell in the memory array is subjected to the same NBTI/PBTI degradation during the life of usage. However, such an assumption implies that each SRAM cell in an array either experiences a static stress condition (storing either '1' or '0') for a substantial amount of time or an alternating stress condition (storing '1' and '0' for equal duration) during the life of usage. The static stress condition is generally too pessimistic for most real-world scenarios. For example, the static stress condition models the cell as storing the same data for a very long time, indicating that the cell is in an asymmetric condition throughout most of its life. Although the data may be read multiple times, the memory cell is not flipped for a relatively long duration, such as a few months. The threshold voltage shift or increase due to NBTI/PBTI is generally larger for the static stress condition than that for the alternating stress condition, as there is very little if any recovery time. As a result, there is a substantial threshold voltage increase in the transistors of the SRAM cell, which causes cell stability issues that lead to memory failure. The static stress model may be appropriate for certain arrays which are accessed only during a particular mode of operation and remain powered on all the time.

In comparison to the static stress condition, the alternating stress condition is similarly an extreme case, as it does not accurately model most practical applications. However, in contrast to the static stress condition, the alternating stress condition is too optimistic, as it assumes that the cell is regularly flipped, indicating that the cell is in a symmetric condition throughout its life. Accordingly, the model presumes that the times for storing '1' and '0' are equal and accounts for a significant amount of relaxation. However, under this condition, NBTI/PBTI causes the β-ratio between pull-down and pass-gate transistors of a cell to vary. Accordingly, the potential difference weakens and the failure of reads becomes more likely. In comparison to the static stress condition, the threshold voltage shift is less for the alternating stress condition due to low power-on times. The alternating stress model may be suitable for data caches.

As indicated above, the simple approach to estimating the temporal degradation of SRAMs assumes that all of the cells in the memory array are under a static stress condition or an alternating stress condition. Further, the change in memory fail probability in the simple approach is computed for both the static stress (worst) case as well as alternating stress (best) case. However, these are two extreme cases, and, in practice, all the SRAM cells in an array are subject to degradation between these two extreme cases. Using either of these cases may result in either too optimistic (alternating stress) or too pessimistic (static stress) End-Of-Life (EOL) yield estimation of a product. As noted earlier, pessimistic yield estimation will result in discarding possibly good parts before shipping whereas optimistic yield estimation may result in product failure at a customer's location.

Exemplary embodiments described herein provide an accurate means of estimating the temporal degradation of memory cell arrays due to NBTI/PBTI by monitoring the usage of each cell in the array. In particular, embodiments can determine the effects of biased temperature instability on the threshold voltages of transistors of memory cells by resolving and utilizing the different durations at which the respective cells are in an on or off state during usage. For example, embodiments can convert the usage of each transistor in a memory array to corresponding threshold voltage degradations by using a stress-recovery model. The SRAM array usage can be determined using benchmark tools while the stress-recovery model can be determined using transistor measurements. Further, embodiments of the present principles provide a technique for predicting the yield of a memory array at the end-of-life based on the usage of each transistor in the array. For example, cell usage estimation can be performed by running benchmark applications, such as cache simulators, and by monitoring data stored in each SRAM cell over a period of time while running the applications. Based on the usage of the cell, an estimate of how the threshold voltage has degraded over time can be made. The process can be repeated over several cells and chips to estimate a final yield for the circuit and to estimate how the yield has degraded due to bias temperature instabilities.

It should be understood that, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of foams, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As indicated above, embodiments of the present invention can enhance the accuracy of estimating the change in memory failure probability based on the expected usage of each SRAM cell. In particular, exemplary embodiments are directed to methods, systems and devices that convert the usage of an SRAM cell, which is modeled as duration of '1' or '0,' as described in more detail herein below, into a threshold voltage degradation estimate of each transistor. In addition, exemplary embodiments are also directed to methods, systems and devices that compute the memory fail probability (or yield) due to a particular usage distribution.

Figure 2:
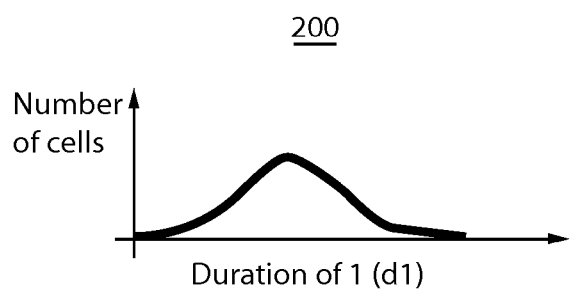
FIGS. 2-3 are graphs of exemplary usage distributions of cells in one or more memory cell arrays.
Figure 3:
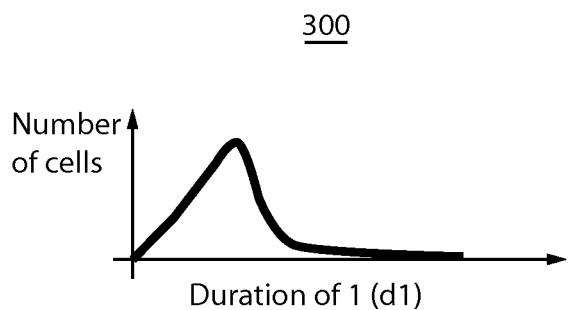

To illustrate exemplary implementations of the present principles, reference is now made to the drawings in which like numerals represent the same or similar elements and initially to FIG. 1, where a high-level block diagram of a system 100 including several memory cell arrays 101 is illustrated. Here, the system 100 can be a circuit of a circuit design to be tested. The memory cell arrays 101 are denoted by k=1, 2, . . . , K, where the system 100 is comprised of K memory cell arrays. In accordance with exemplary aspects, benchmark applications can be run to estimate the usage of each memory cell in the system 101. Specifically, benchmark applications that are tailored to the expected usage of a memory cell array 101 can be applied to the array. For example, such benchmark applications can be tailored to a video cache, instruction/data caches, or other types of usage. Memory cell arrays 102 and 104 of the system 100 can be subject to the same or different benchmark applications to obtain an indication of the expected usage of the memory cell arrays. Here, the usage of the memory cell arrays 102 and 104 in accordance with the benchmark application(s) can be monitored to construct usage distributions 200 (corresponding to the usage of array 102) and 300 (corresponding to the usage of array 104) illustrated in FIGS. 2 and 3, respectively. The distributions 200, 300 are plots of the number or fraction of cells in the respective array 102, 104 v. the duration of '1'. The "duration of '1'" indicates the fraction or percentage of time a given cell in the array 102 or 104 is storing '1' in accordance with its usage. Alternatively, a distribution of the number of cells in the respective array v. the duration of '0,' which indicates the fraction or percentage of time a given cell in the array is storing '0' in accordance with its usage, where (duration of '1')=(1−duration of '0'), can be determined to implement embodiments herein.

Figure 4:
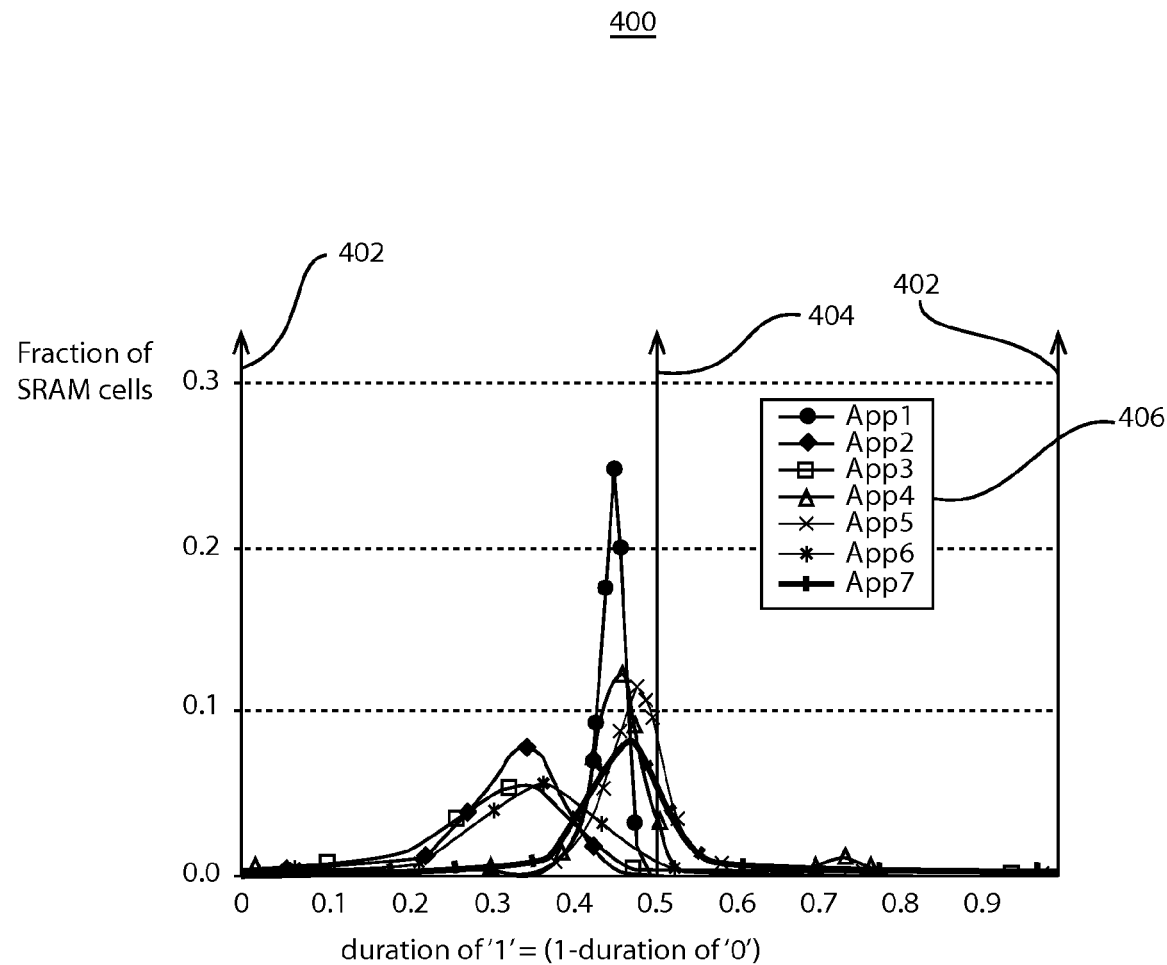
FIG. 4 is a graph of different usage distributions of a given memory cell array resulting from the application of simulation processes modeling different types of memory usage.

FIG. 4 provides usage distributions 400 that indicate the usage of a given memory cell array 102 in accordance with several benchmark applications. Here, seven exemplary benchmark applications 406 that model different usage types (e.g., video cache, instruction/data cache, etc.) were applied to a given memory cell array to obtain corresponding distributions denoted by the legend in FIG. 4. The distribution plots are shown with representations of the static stress condition 402 and the alternating stress condition 404, which are represented as delta functions in FIG. 4. As illustrated in FIG. 4, the particular distributions of the memory cell array varies considerably with different usage applications and are not accurately modeled by either of the static stress condition or the alternating stress condition. The utilization of such benchmark applications in accordance with exemplary aspects of the present principles to estimate threshold voltage changes and/or cell fail probability and yield are described in more detail herein below with respect to system and method embodiments.

Figure 5:
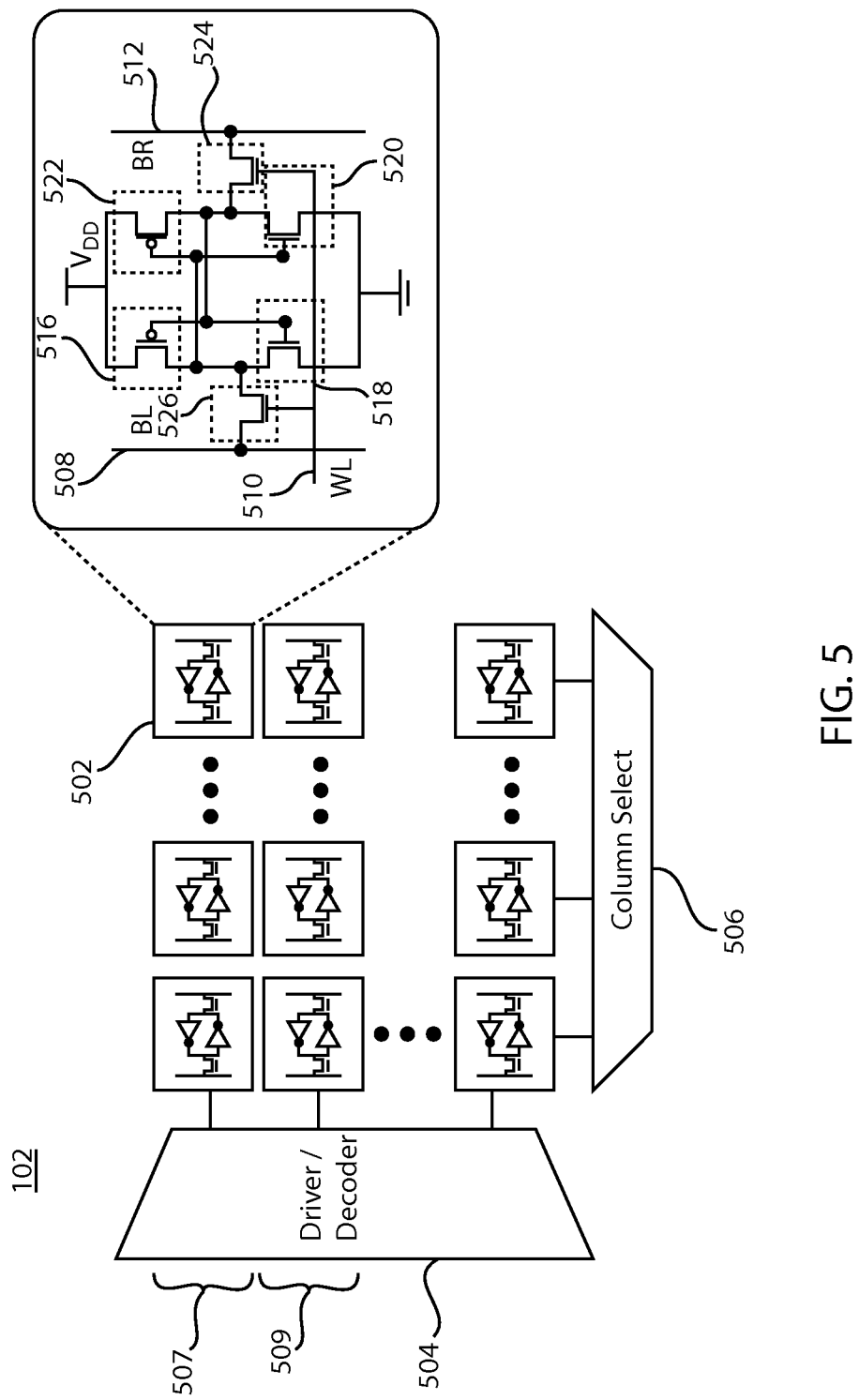
FIG. 5 is a high-level block diagram of an exemplary memory cell array.

Prior to describing the system and method embodiments in detail, a brief description of a given memory cell array 102 of the system 100 is provided for ease of understanding. FIG. 5 provides a more detailed illustration of the memory array 102, which can include a driver/decoder element 504, a column select circuit 506 and a plurality of cells 502, each of which can be an SRAM cell. Each cell 502 can include a word line (WL) 510, a left bit line (BL) 508, a right bit line (BR) 512 and a plurality of transistors 516-526.

Figure 6:
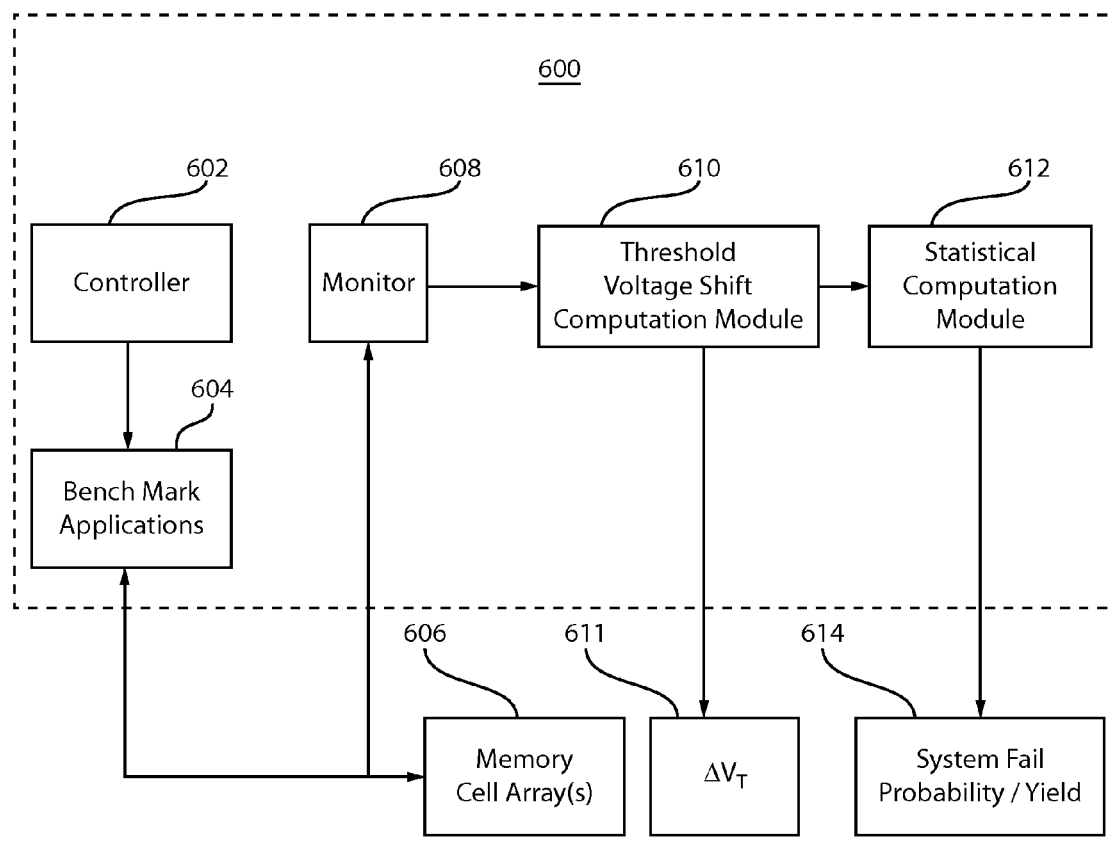
FIG. 6 is high-level block/flow diagram of an exemplary system for estimating the threshold voltage change of transistors in a memory cell array and for calculating a cell fail probability and yield in accordance with one illustrative embodiment.

Referring now to FIG. 6, with continuing reference to FIGS. 1, 4 and 5, an exemplary system 600 for estimating the threshold voltage change of transistors in a memory cell array and/or for calculating a cell fail probability and yield is illustrated. The system 600 can include a controller 602, a repository 604 of processes, for example, benchmark applications, a monitor 608, a threshold voltage shift computation (TVSC) module 610 and a statistical computation (SC) module 612. The controller 602 can, in general, control the operations of the system 600. As described in more detail herein below, the controller 602 can run benchmark applications to model or implement usage of one or more memory arrays 606, which can be any one or more of the memory cell arrays 102 and 104 and can be monitored by the monitor 608. In addition, usage data compiled by the monitor 608 can be employed by the computation modules 610 and 612 to estimate threshold voltage change or shifts 611 and system fail probability and/or yield 614 with respect to the memory arrays 606. The functions of the various elements of the system 600 are described in more detail herein below with respect to method embodiments. It should be noted that each of the elements of the system 600 can be implemented by one or more hardware processors utilizing one or more storage mediums. For example, the elements of the system 600 can be implemented by a hardware processor that is configured to perform a series of steps of a software program stored on a storage medium.

Figure 7:
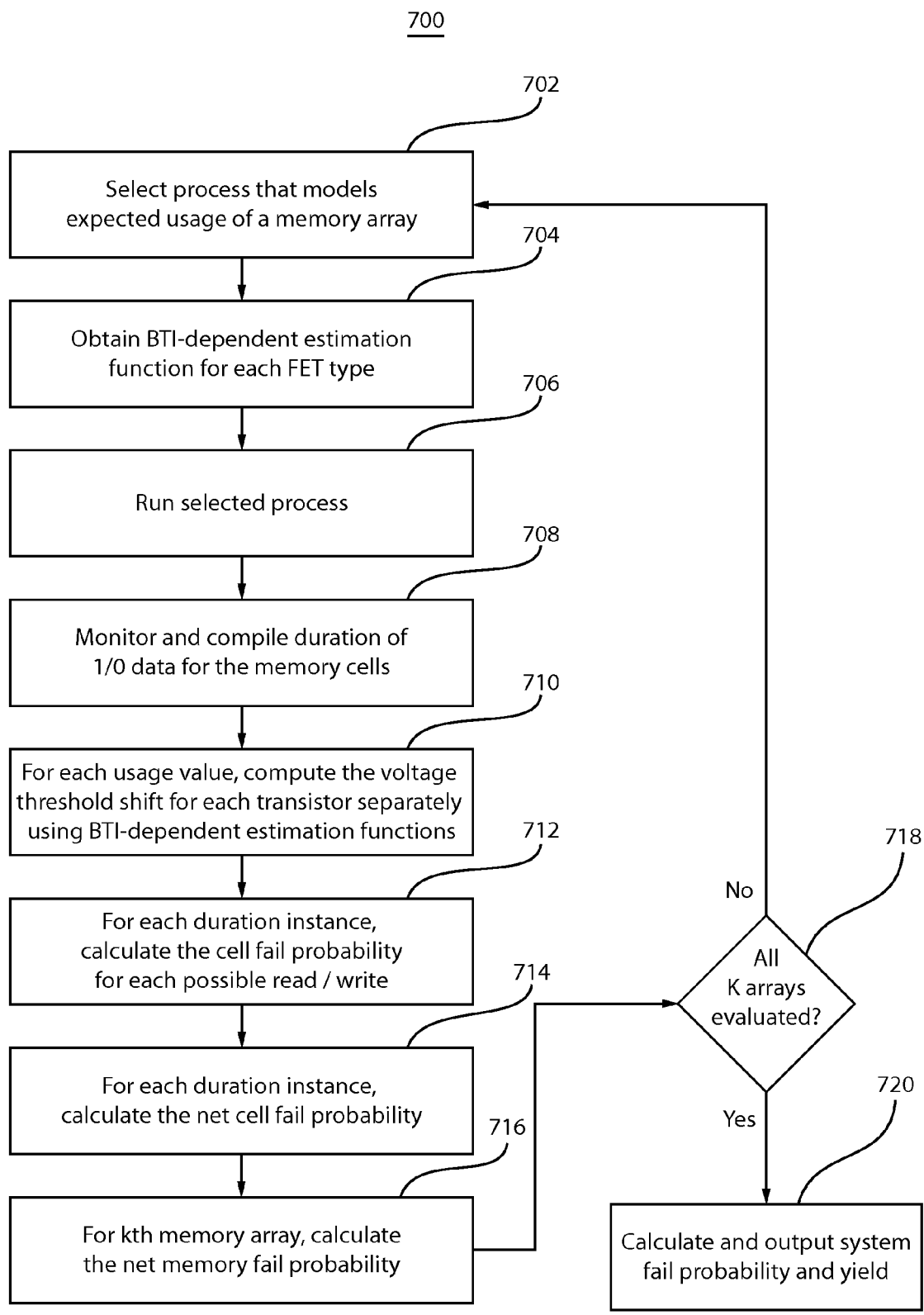
FIG. 7 is a high-level block/flow diagram of an exemplary method for estimating the threshold voltage change of transistors in a memory cell array and/or for calculating a cell fail probability and yield in accordance with one illustrative embodiment.

Referring now to FIG. 7, with continuing reference to FIGS. 1, 4, 5 and 6, a method 700 for estimating the threshold voltage change of transistors in one or more memory cell arrays and/or for calculating a cell fail probability and yield for a circuit including a plurality of memory arrays is illustratively depicted. The method 700 can begin at step 702, at which the controller 602 can select one or more processes, for example, benchmark applications, that model an expected usage of one or more memory cell arrays 606 from the processes or applications stored in the repository 604. For example, as indicated above, if the expected usage of memory array 102 is a video cache, the controller 602 can select the benchmark application in the repository that most closely simulates the usage of a video cache. The controller 602 can select different benchmark applications for different memory cell arrays 101, or in some embodiments different memory cells or portions within a memory cell array, in the same system or circuit 100 depending on the expected usage of the particular memory cell array/memory cells of the system or circuit 100. As indicated above, the processes or applications in the repository 604 can model different, respective memory cell array usages. The expected usage or usages of the memory cell arrays/memory cells can be input by a user of the system 600.

At step 704, the controller 602 can obtain a Biased Temperature Instability (BTI)-dependent estimation function for each transistor type in the memory cell array or arrays that are evaluated by the method. For example, the BTI dependent change in the threshold voltage ($V_T$) of each transistor type can be based on hardware and can be modeled as follows: $\Delta V_T = f(\text{Temp}, V_{dd}, T_{relax}, T_{stress})$ where $\Delta V_T$ is the change or degradation in the threshold voltage of a given transistor, Temp denotes a function that models the temperature of the transistor, $V_{dd}$ denotes a supply voltage, $T_{relax}$ denotes the amount of time the transistor is in the relaxed state and $T_{stress}$ denotes the amount of time the transistor is in the stressed state. The function $f(\text{Temp}, V_{dd}, T_{relax}, T_{stress})$ is dependent on and can be determined from hardware data for the respective transistor type. A $\Delta V_T$ function can be given as $\Delta V_T = f(\text{Temp}, V_{dd}, T_{relax}, T_{stress}) = FR \times A \times (V_{dd}^\gamma) \times (e^{-Ea/kTemp}) \times (T_{stress}^n) \alpha$, where the Fraction Remaining (FR) can be computed as $$FR = \left(1 + \alpha\left(\frac{T_{relax}}{T_{stress}}\right)^\beta\right)^{-1}.$$

The parameters A, α, β, γ, η and Ea (activation energy) can be different for NMOS and PMOS types of transistors and are fitted to a particular technology by performing hardware measurements, and k, is Boltzmann's constant. For example, γ can be determined by performing hardware measurements at different $V_{dd}$. The transistor type of each transistor can be indicated in a design of the memory array(s) 606 that is under evaluation.

At step 706, the controller 602 can initiate and run the one or more processes selected at step 702 to populate the corresponding one or more memory arrays for which the one or more processes is selected. For example, each memory cell 502 and/or memory cell array 606 can be populated with data over time by the corresponding process or application that was selected for it at step 702. In addition, as indicated above, over several iterations of the method 700, the controller 602 can run different selected processes or applications for their corresponding arrays. For example, in one iteration of the method 700, the controller 602 can select a process or application 'A' in the repository 604 at step 702 for the memory cell array 102 in accordance with the expected use of the array 102 and can run the process 'A' on the memory cell array 102 at step 706. In a different iteration of the method 700, the controller 602 can select a process or application 'B' in the repository 604 at step 702 for the memory cell array 104 in accordance with a different expected usage of the memory cell array 104 and can run the process 'B' on the memory cell array 104 at step 706. The method can be repeated for, for example, K iterations, where each iteration corresponds to a different memory cell array 101 and where the circuit includes K memory cell arrays. The controller 602 can be configured to select and run a different process or application for each of the different memory cell arrays if the expected usages of the arrays demand the utilization of the different processes or arrays in this manner. Alternatively, the controller 602 can run different processes or applications on different portions of a given memory cell array. For example, at step 702, the controller 602 can select a process or application 'A' in the repository 604 for a portion 507 of cells of the memory cell array 102 in accordance with an expected use of the portion 507 and can select a process or application 'B' in the repository 604 for a portion 509 of cells of the memory cell array 102 in accordance with the expected use of the portion 509. Moreover, here, at step 706, the controller 602 can run the selected process 'A' on the portion 507 and can run the selected process 'B' on the portion 509 to simulate the expected usages of the portions 507 and 509, respectively. In addition, the controller 602 can similarly select and run applications for different portions of any one or more of the other memory cell arrays of the circuit 100, such as memory array 104.

Figure 8:
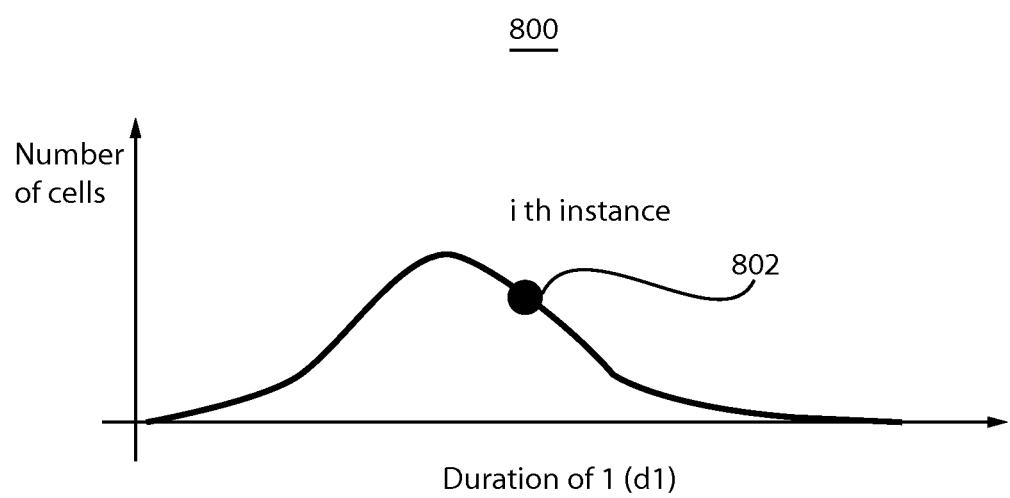
FIG. 8 is a graph of an exemplary usage distribution of cells in one or more memory cell arrays.

At step 708, the monitor 608 can obtain and compile data indicating duration of '1' and/or duration of '0' data for the cell(s) of the array(s) 606 under evaluation. For example, the monitor 608 can compile data that detail different durations at which each of the memory cells in the one or more memory cell arrays under evaluation is storing '1' or at which each of the memory cells in the one or more memory cell arrays under evaluation is storing '0.' For example, the monitor 608 can monitor the data stored in each memory cell 502 by the application(s) run at step 706 over time to determine the amount of time the cell is storing '1' or storing '0.' As noted above, the benchmark applications can simulate the population and switching of data in software the simulation can output a history of the data input into cells with their corresponding durations that is compiled by the monitor 608. Further, the monitor can determine the usage distribution of the one or more arrays evaluated. For example, FIG. 8 depicts an exemplary usage distribution 800 for the memory cell array 102 that can be determined from the data compiled by the monitor 608. The distribution 800 is a plot of a fraction or the number of cells in the array 102 v. the duration of '1,' which, as indicated above, can be the total time or a fraction or percentage of time a given cell in the array 102 is storing '1.' It should be noted that step 708 can alternatively be performed to compile duration of '0' data for the cells.

At step 710, for each usage value, based on the duration of '1' and/or duration of '0' data compiled at step 708, the TVSC module 610 can compute the threshold voltage shift for each transistor separately using the BTI-dependent estimation function(s). In particular, the TVSC module 610 can determine, for each of the memory cell arrays of the circuit 100 and for each separate grouping of memory cells that share a common duration of the different compiled durations, a threshold voltage degradation for each transistor in the corresponding grouping of cells based on at least one biased temperature instability model. For example, each $i^{th}$ usage value 802 in FIG. 8 corresponds to a given number of cells in an array, e.g. array 102, that have a given duration of storing '1' for an $i^{th}$ amount of time. Here, the given number of cells corresponding to the $i^{th}$ duration of '1' (or duration of '0,' if this parameter is employed) is one example of a grouping of memory cells that share a common duration (e.g., $i^{th}$ duration of '1') of the different durations compiled to form the distribution 800. Furthermore, for each $i^{th}$ usage value 802, corresponding to the duration of '1', $dl_i(=1-d0_i)$, at the iposition or instance in the distribution, the TVSC module 610 can calculate the threshold voltage degradation ($\Delta V_T$) for each transistor in the corresponding cell(s) using NBTI and PBTI models. For example, as indicated above, an NBTI and a PBTI model can be formulated as follows: $\Delta V_T = f(Temp, V_{dd}, T_{relax}, T_{stress})$ For a given cell 502 in a corresponding grouping of cells for the $i^{th}$ usage instance, the TVSC module 610 can calculate a voltage degradation $\Delta V_T$ for each transistor 516-526 in the cell 502. For example, TVSC module 610 can calculate a voltage degradation $\Delta V_T$ for transistor 516, a voltage degradation $\Delta V_T$ for transistor 518, a voltage degradation $\Delta V_T$ for transistor 520, etc. Here, to determine $\Delta V_T$ for a given transistor, the TVSC module 610 can compute and $T_{relax}$ and $T_{stress}$ as follows. During the life of usage, which is denoted as $T_{use}$, if a given transistor in a cell 502 is stressed while the cell 502 is storing '0' and is relaxed or relaxing while storing '1,' then the transistor's $T_{relax}$ and $T_{stress}$ can be based on the duration $d1_i(=1-d0_i)$ and can be computed as $T_{relax}=d1_i \times T_{use}$, and $T_{stress}=(1-d1_i) \times T_{use}$. $d1_i$ denotes the duration of '1' at the $i^{th}$ instance of a usage distribution, such as distribution 800. For other transistors in the cell 502, for example, a transistor that is stressed while the cell 502 is storing '1' and is relaxed or relaxing while storing '0,' the transistor's $T_{relax}$ and $T_{stress}$ can be computed as $T_{stress}=d1_i \times T_{use}$, and $T_{relax}=(1-d1) \times T_{use}$. It should be noted that the function $\Delta V_T = f(Temp, V_{dd}, T_{relax}, T_{stress})$ for a given transistor can account for and be based on an amount or degree of recovery after relaxation, which can be denoted as the fraction remaining (FR) after $T_{relax}$. The TVSC module 610 can determine the degree of recovery to find $\Delta V_T$. For example, the TVSC module 610 can compute the fraction remaining as follows:

$$FR = \left(1 + \alpha \left(\frac{T_{relax}}{T_{stress}}\right)^\beta\right)^{-1},$$

where $\alpha$ and $\beta$ are calibrated parameters that can be obtained by hardware measurements. For example, $\alpha$ can be obtained by performing a measurement to compute FR, where relax and stress times are the same, i.e., $T_{relax}=T_{stress}$, thereby reducing FR to FR $=1/(1+\alpha)$ or $\alpha=(1/FR)-1$. It should be noted that if $\Delta V_T$ is formulated as $\Delta V_T = f(Temp, V_{dd}, T_{stress}, T_{relax})$ then the net $\Delta V_T$ after usage $T_{use}$, in a transistor, which is getting stressed when the cell was storing '0' for the duration $1-d1_i$, and relaxed when the cell was storing '1' for the duration $d1_i$, can be formulated as $$\Delta V_T |_{T_{use}} = \frac{A \times (V_{dd}^\gamma) \times (e^{-Ea/kTemp}) \times (T_{stress}^n)}{\left(1 + \alpha\left(\frac{d1_i}{1-d1_i}\right)^\beta\right)}.$$

At step 712, for each duration instance i, the SC module 612 can compute the cell fail probability for each possible read/write case. In particular, the SC module 612 can determine, for each of the arrays in the circuit 100 and for each separate grouping of memory cells in the corresponding array that share a common duration (i) of the different durations compiled at step 708 for the corresponding array, a read fail probability for each of a read zero case and a read one case and a write fail probability for each of a write zero case and a write one case. For example, for each $i^{th}$ usage value, corresponding to the duration of '1', $d1_i(=1-d0_i)$, at the $i^{th}$ position or instance in the distribution 800, the TVSC module 610 can calculate the cell fail probability ($P_{fcell}^i$) for the cells having the ith usage value by employing Monte-Carlo simulations for each of the following cases: Read '0' (RD0), Read '1' (RD1), Write '0' (WR0) and Write '1' (WR1). For example, to compute $P_{fcell,RD0}^i$, a '0' can be stored in a cell and Monte-Carlo read operations are performed while applying statistical threshold voltage shifts or some other transistor parameter shifts to each of the six transistors 516, 518, 520, 522, 524 and 526. For example, these statistical threshold voltage values can occur due to random dopant fluctuations in the transistors causing threshold voltages to shift randomly between the transistors. The random threshold voltages are modeled by randomly selecting values from a Monte-Carlo simulation distribution, which can be Gaussian. Further, to account for BTI effects, the threshold voltage degradations or shifts $\Delta V_T$ determined at step 710 for the corresponding transistors can be added to the values selected from the distribution to obtain net threshold voltages. Over time, the threshold voltage degradations $\Delta V_T$ increase and have a greater effect on the net threshold voltages. These net threshold voltages are used to model the transistors at different points in time to determine whether the corresponding cell is stable or will fail at these times. The number of read operations when the cell fails divided by the total number of read operations will give the $P_{fcell,RD0}^i$. Similarly, $P_{fcell,RD1}^i$ can be obtained by storing '1' in the cell and performing Monte-Carlo read simulations, as described above. $P_{fcell,WR0}^i$ is obtained by first storing '1' in the cell and then doing a write operation to write '0' in the cell. Again Monte-Carlo write simulations are performed to calculate $P_{fcell,WR0}^i$ in a similar manner. Likewise, $P_{fcell,WR1}^i$ is can be obtained by first storing '0' in the cell and then doing a write operation to write '1' in the cell.

At step 714, for each duration or usage instance for each memory cell array evaluated, the SC module 612 can calculate a net cell fail probability. For example, the net cell fail probability $P_{fcell}^i$ for each of the cells having $d1_i$ in common can be calculated as the highest fail probability between a net read fail probability $P_{fcell,READ}^i$ and a net write fail probability $P_{fcell,WRITE}^i$ as follows: $P_{fcell}^i = \max(P_{fcell,READ}^i, P_{fcell,WRITE}^i)$. Here, the SC module 612 can calculate the net read fail probability as follows: $P_{fcell,READ}^i = (1-d1_i)P_{fcell,RD0}^i + d1_i P_{fcell,RD1}^i$ for a double-sided (differential) READ or $P_{fcell,READ}^i = (1-d1_i)P_{fcell,RD0}^i$ for a single-ended READ. In addition, the SC module 612 can calculate the net write fail probability as follows: $P_{fcell,WRITE}^i = (1-d1_i)P_{fcell,WR1}^i + d1_i P_{fcell,WR0}^i$.

At step 716, for a $k^{th}$ memory cell array that is evaluated in a given iteration of the method 700, the SC module 612 can calculate the net memory fail probability ($P_{fMEM}^k$). For example, the SC module 612 can calculate the net memory fail probability for the $k^{th}$ memory cell array 101 as follows:

$$P_{fMEM}^k = 1 - \prod_i (1 - P_{fcell}^i)^{N_i},$$

where $N_i$ is the total number of cells in the $k^{th}$ memory cell array that share a common duration of 'one' $d1_i$. As such, the total number of cells ($N_{cells,k}$) in the $k^{th}$ memory cell array is as follows $$N_{cells,k} = \prod_i N_i.$$

At step 718, the controller 602 can determine whether all K memory cell arrays in the circuit or system have been evaluated. If not, then the method can proceed to step 702 and can be repeated for a different memory cell array 101 in the circuit 100. Preferably, the steps 702-716 are performed on an array-by-array basis, as a system can contain several different-purpose memories. If the controller 602 determines at step 718 that all K memory cell arrays in the circuit or system have been evaluated, then the method can proceed to step 720, at which the SC module 610 can calculate and output a system fail probability and/or a yield. For example, the SC module 610 can calculate the system fail probability as $$P_{fSYS} = 1 - \prod_k (1 - P_{fMEM}^i)^{N_i}.$$

In addition, the SC module 610 can calculate the yield as follows Yield=$(1-P_{fSYS})\times 100\%$.

It should be understood that although fail probabilities and yields can be determined and output in accordance with the method 700, in other embodiments, the threshold voltages determined at step 710 can be independently useful and output by the controller 602 without computed fail probabilities and/or yields.

As indicated above, the simple approach to determining SRAM End-Of-Life determination can only predict best and worst cases, which are typically not seen by any memory system in use. In contrast, the embodiments described herein can employ usage-based degradation to enable realistic yield estimation for application-specific memory systems. The present approach can evaluate each memory array individually by accounting for the specific purpose for which the memory arrays are employed. In particular, embodiments determine the effects of biased temperature instability on the threshold voltages in transistors of memory cells by resolving and utilizing the different durations at which the respective cells are storing '1' or '0' during usage. As a result, an accurate estimate of threshold voltage degradation can be provided to ensure that reliable system fail probability and yields can be determined.

Having described preferred embodiments of systems and methods for usage-based temporal degradation estimation for memory elements (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for computing threshold voltage degradation of transistors in one or more arrays of memory cells comprising:
   selecting a process that models an expected usage of the array;
   running the process, by a hardware processor, to populate the one or more arrays with data over time to simulate the expected usage of the one or more arrays;

compiling data that detail different durations at which each of the memory cells in the one or more arrays stores 1 or at which each of the memory cells in the one or more arrays stores 0;

computing a threshold voltage shift separately for each of the transistors in the one or more arrays using at least one biased temperature instability model;

for each of one or more separate groupings of memory cells that share a common duration of the different compiled durations, determining a threshold voltage degradation for each transistor in the corresponding grouping of cells based on the at least one biased temperature instability model; and determining a net cell fail probability for each of the one or more arrays based on the computed threshold voltage shift and the determined threshold degradation.

2. The method of claim 1, wherein the determining the threshold voltage degradation for each transistor further comprises computing a time at which the transistor is in a stressed state and a time at which the transistor is in a relaxed state.

3. The method of claim 2, wherein the determining the threshold voltage degradation for each transistor further comprises determining a degree of recovery after relaxation.

4. The method of claim 1, wherein the selecting comprises selecting the process from a plurality of processes that model different memory cell array usages.

5. The method of claim 4, wherein the selecting comprises selecting a plurality of processes from the processes that model different memory cell array usages.

6. The method of claim 5, wherein the running comprises running each of the selected processes on different portions of the memory cell array.

7. A method for computing at least one of circuit fail probability or circuit yield of a circuit including a plurality of arrays of memory cells comprising:

running at least one process, by a hardware processor, that models an expected usage of the arrays to populate the arrays with data over time to simulate the expected usage of the arrays;

compiling data that detail different durations at which each of the memory cells in each of the arrays stores 1 or at which each of the memory cells in each of the arrays stores 0;

computing a threshold voltage shift separately for each of the transistors in each of the arrays using at least one biased temperature instability model;

for each of the arrays and for each of one or more separate groupings of memory cells in the corresponding array that share a common duration of the different durations compiled for the corresponding array, determining a cell fail probability based on the at least one biased temperature instability model;

computing at least one of the circuit fail probability or circuit yield of the circuit based on the determined cell fail probabilities; and determining a net cell fail probability for the plurality of arrays based on the computed threshold voltage shift and the determined threshold degradation.

8. The method of claim 7, wherein the cell fail probability is a net cell fail probability and wherein the method further comprises:

for each of the arrays and for each separate grouping of memory cells in the corresponding array that share a common duration of the different durations compiled for the corresponding array, determining a read fail probability for each of a read zero case and a read one case.

9. The method of claim 8, further comprising:

for each of the arrays and for each separate grouping of memory cells in the corresponding array that share a common duration of the different durations compiled for the corresponding array, determining a write fail probability for each of a write zero case and a write one case.

10. The method of claim 9, wherein the determining the net cell fail probability comprises selecting a highest fail probability from the corresponding read fail probability and the corresponding write fail probability.

11. The method of claim 7, further comprising:

selecting multiple processes from a plurality of processes that model different memory cell array usages.

12. The method of claim 11, wherein the running comprises running the multiple processes on the plurality of arrays such that different selected processes are respectively run on at least two of the plurality of arrays.

* * * * *